US010093474B2

(12) United States Patent
Littman et al.

(10) Patent No.: US 10,093,474 B2
(45) Date of Patent: Oct. 9, 2018

(54) SELECTIVELY CHANGEABLE, VOLUMETRIC DISPENSERS AND METHODS OF DISPENSING MATERIALS HAVING KNOWN UNIT VOLUMES

(71) Applicants: Jason Littman, Plainview, NY (US); Terence O'Shea, Plainview, NY (US)

(72) Inventors: Jason Littman, Plainview, NY (US); Terence O'Shea, Plainview, NY (US)

( * ) Notice: Subject to any disclaimer, the term of this patent is extended or adjusted under 35 U.S.C. 154(b) by 0 days.

(21) Appl. No.: 15/170,935

(22) Filed: Jun. 1, 2016

(65) Prior Publication Data

US 2016/0346167 A1 Dec. 1, 2016

Related U.S. Application Data

(60) Provisional application No. 62/169,532, filed on Jun. 1, 2015.

(51) Int. Cl.

| | |
|---|---|
| ***B65G 47/14*** | (2006.01) |
| ***B65G 59/00*** | (2006.01) |
| ***G07F 11/00*** | (2006.01) |
| ***B65D 83/04*** | (2006.01) |
| ***G07F 17/00*** | (2006.01) |
| ***G07F 11/44*** | (2006.01) |
| ***G07F 13/02*** | (2006.01) |
| *A61J 7/00* | (2006.01) |

(52) U.S. Cl.
CPC .......... *B65D 83/0409* (2013.01); *G07F 11/44* (2013.01); *G07F 13/025* (2013.01); *G07F 17/0092* (2013.01); *A61J 7/0084* (2013.01)

(58) Field of Classification Search
CPC ... B65D 83/0409; G07F 11/44; G07F 13/025; G07F 17/0092; A61J 7/0084
USPC .............................................................. 221/1
See application file for complete search history.

(56) References Cited

U.S. PATENT DOCUMENTS

| | | | | |
|---|---|---|---|---|
| 3,556,342 A * | 1/1971 | Guarr | A61J 7/0084 | 221/124 |
| 3,994,409 A * | 11/1976 | Nightengale, Jr. | B65D 41/485 | 215/256 |
| 4,869,392 A * | 9/1989 | Moulding, Jr. | A61J 7/0481 | 221/1 |
| 5,259,532 A * | 11/1993 | Schwarzli | G07F 11/44 | 221/203 |
| 6,048,087 A | 4/2000 | Laurent et al. | | |
| 6,263,259 B1 * | 7/2001 | Bartur | A61J 7/0481 | 700/236 |
| 6,742,671 B2 * | 6/2004 | Hebron | B65B 57/20 | 221/10 |
| 6,994,409 B2 | 2/2006 | Godlewski | | |
| 7,107,122 B1 * | 9/2006 | Whyte | A61J 7/0481 | 221/12 |
| 7,151,982 B2 * | 12/2006 | Liff | G06F 19/3462 | 700/241 |
| 8,099,929 B2 | 1/2012 | Kirby et al. | | |

(Continued)

FOREIGN PATENT DOCUMENTS

| | | | | |
|---|---|---|---|---|
| GB | 2297543 A * | 8/1996 | G07F 11/24 |
| WO | WO-2006052671 A3 * | 11/2008 | G07F 11/44 |

*Primary Examiner* — Rakesh Kumar

(74) *Attorney, Agent, or Firm* — Daniel P. Burke & Associates, PLLC

(57) ABSTRACT

Volumetric dispensers and methods dispense one or more units of a material having units with a volume utilizing independently controllable and linearly movable gates.

19 Claims, 12 Drawing Sheets

(56) References Cited

U.S. PATENT DOCUMENTS

| | | | | |
|---|---|---|---|---|
| 8,141,330 | B2 * | 3/2012 | Henkel | B65B 5/103 53/237 |
| 8,191,339 | B2 * | 6/2012 | Tribble | B65B 3/003 53/281 |
| 8,251,629 | B2 | 8/2012 | Schifman | |
| 8,469,194 | B2 | 6/2013 | Johnson et al. | |
| 8,601,776 | B2 * | 12/2013 | Henkel | B65B 5/103 53/473 |
| 8,666,543 | B2 | 3/2014 | MacVittie | |
| 8,774,962 | B2 * | 7/2014 | Williams | G07F 11/44 221/123 |
| 9,101,531 | B1 * | 8/2015 | Song | A61J 7/0472 |
| 9,669,989 | B2 * | 6/2017 | Sanders | B65D 83/0409 |
| 2009/0321472 | A1 * | 12/2009 | Knoth | B65B 5/103 221/124 |
| 2015/0076170 | A1 * | 3/2015 | Goettke | B65D 83/0409 221/250 |
| 2016/0244267 | A1 * | 8/2016 | Rendell | B65G 47/19 |
| 2016/0346167 | A1 * | 12/2016 | Littman | G07F 17/0092 |
| 2017/0259986 | A1 * | 9/2017 | Sanders | A61J 1/03 |

* cited by examiner

SELECTIVELY CHANGEABLE, VOLUMETRIC DISPENSERS AND METHODS OF DISPENSING MATERIALS HAVING KNOWN UNIT VOLUMES

RELATED APPLICATION DATA

This application claims priority on U.S. provisional patent application 62/169,532 filed Jun. 1, 2015, which is hereby incorporated by reference.

Disclosed are volumetric dispensers and methods of dispensing one or more units of a material having a known unit volume.

BACKGROUND

Dispensing a precise and accurate amount of material has many uses. Currently, there are at least two common ways that units of material(s) are dispensed. AS used herein, the terms "unit" and "item" are used to indicate a discrete quantity of a solid or semi-solid material, e.g. one pill or one box. In one method, a human or robotic arm may select units. In a second common method, items may be dispensed at a fixed volume or mass. Some volumetric dispensers do not permit the adjustment of the mass or volume to be dispensed as dispensing needs change. Additionally, many methods may require human input to verify accuracy and precision of the dispense. Human input can result in errors, inaccuracies, and time inefficiency.

Dispensing a precise and accurate number of units has many uses. Examples of units for which automated dispensing is useful include, but are not limited to: pills, capsules, surgical supplies, medical supplies, food stuffs, shipping materials, and manufactured parts. Currently, there are known mechanisms for the automated or partially-automated dispensing of units. These mechanisms are based on, but are not limited to, selection by: mass, volume, density, imaging, and unique item selection.

For certain material(s), uses, and limitations, volumetric selection is appropriate. Volumetric dispensing devices have been proposed before. Some known devices have several disadvantages, such as: inability or difficulty with modifying the desired volumes for dispensing, inaccurate dispenses, and jamming.

Some previous volumetric dispensing devices have made it difficult or impossible to adjust the dimensions of the device to accommodate units of different size. Since materials to be dispensed may have different physical dimensions or shapes, such devices may be unsatisfactory for one's dispensing needs. Furthermore, non-automated adjustments of the dimensions of the device can make it difficult and/or time consuming for individuals to properly adjust controlling the dimensions of the dispensing device and, thus, to properly dispense the desired materials.

Some known adjustable volumetric dispensing devices have also made it difficult or impossible to dispense a wide range of shapes and dimensions of material(s) due to the eccentricity of the dispensing mechanism. At least one known volumetric dispensing device has two, stacked movable dispensing rings comprising circular openings. Relative rotation of the rings allows for a changeable dispensing opening, which can only form a circular dispensing opening when the two circular openings are perfectly aligned. For all other alignments, a range of elliptical dispensing openings are formed when the circular openings are not aligned. Since the dispensing rings are stacked, the circular openings are offset somewhat in the vertical direction. Mechanisms which rely on this type of elliptically shaped dispensing openings for dispensing materials of different sizes and shapes can result in inaccurate dispensing. As the eccentricity of the dispensing plane increases, the dispensing opening becomes less accurate in its dispensing of less eccentric units. Such mechanisms are also prone to jamming and risk damaging the units being dispensed. This is illustrated below with reference to FIGS. 1-4.

As one example of units to be dispensed which have known dimensions, pharmaceutical pills come in a wide variety of shapes and sizes. For example, one known pill is shaped like a right circular cylinder and has a radius of 2 mm. Another pill is in the shape of a capsule and has a major axis length of 19 mm. Another pill is shaped like a right circular cylinder and has a radius of 20 mm. A still further pill is shaped like a three-pointed star.

FIGS. 1A-4A illustrate three different shaped pills positioned in elliptical openings. For simplification, the elliptical openings are shown as being formed of two gates which are in the same plane, but the prior art known to the present inventors forms these opening with gates which are vertically offset, i.e. not in the same plane, of the type described in the prior art with each Fig. A showing the shape of the pill, each Fig. B showing a top view, each Fig. C showing a perspective view and each Fig. D showing a side view.

FIGS. 1 and 2 illustrate the same pill having the indicated dimensions shown in FIG. 1A. The drug Bayer® Asprin is an example of a pill having these dimensions. It is assumed that gravity will make it more likely that a pill or other unit will be in its position of lowest potential energy, i.e., "lying down", in a dispenser reservoir, therefore it is most desirable to provide dispensing openings which are sized to receive the pill when it is in this orientation. FIGS. 1B-1D illustrate that when an elliptical opening is opened sufficiently to receive the pill shown in FIG. 1A, the elliptical opening will also have room to receive two additional pills in a vertical orientation. The extra space or gaps left in the elliptical opening by a single pill in the "lying down" orientation shown in FIGS. 1B-1D is problematic in that it creates a greater likelihood that more than the desired single pill will be dispensed, as well as a greater risk of jamming or pill breakage if another gate tried to move above the illustrated gates. Pill breakage will also increase the likelihood of inaccurate dispensing since a piece of a pill may slip into a gap of a dispensing opening.

FIGS. 2A-2D illustrate the same pill shown in FIG. 1 and show that it is possible to configure an elliptical opening to receive a vertically oriented pill and thereby leave less of a gap. As noted above, it is believed that it is more difficult to get a pill to enter a dispensing gate in this vertical orientation.

FIGS. 3A-3D show a pill having dimensions $x_2$, $y_2$, $z_2$, where $2y_2$ is less than $x_2$. As shown in FIGS. 3B-3D, an opening which can receive this pill in the "lying down" position will accept two of these same pills in a vertical orientation, thus posing a risk of inaccurately dispensing two pills when it is desired to dispense a single pill.

FIG. 4A shows a pill in the shape of a three-pointed star where $x_2$ equals $y_2$. The drug Xarelto is an example of a pill having these dimensions. FIGS. 4B-4D show that an elliptical opening sized to receive one of these pills in the horizontal or "lying down" orientation will necessarily be dimensioned to receive two of these pills in the same orientation.

SUMMARY

The disclosed volumetric dispensers and methods dispense one or more units of a material having units with a specific volume. While the embodiments will be described with reference to medicinal pills, it will be appreciated that they are equally capable for use in dispensing other materials having units of uniform dimensions.

One embodiment comprises three independently controllable and linearly movable gates with linear edges. As used herein, the term "linear" indicates that the edge is not curved when viewed from directly above. The term "linear" does not preclude a gate edge from having a bevel for reasons set forth below. The use of linearly movable gates with linear edges provides smaller gaps or extra spaces when opened to dispense a unit of a known size. This reduces the risk of dispensing errors, jams and damage to the pills. FIGS. 5A-8D correspond to the views of FIGS. 1A-4D, respectively, and show the same configuration of pills, i.e. the same sizes and shapes, in the same orientations. The top views of FIGS. 5B-8B are particularly illustrative in the smaller gaps or extra spaces provided by the linear edges when compared to the corresponding views of FIGS. 1B-4B.

According to preferred methods, dispensing is accomplished by opening a first gate and a second gate to their respective open dispensing positions, subsequently moving a third gate to its open dispensing position, and then closing one or both of the first gate and second gate to a position which is less than the fully opened dispensing position. The sequential opening and closing of gates permits the dispensing of one unit/pill from the reservoir while preventing the undesired dispensing of a plurality of pills at the same time.

DETAILED DESCRIPTION

Figures 1A, 1B, 1C, 1D, 2A, 2B, 2C, 2D, 3A, 3B, 3C, 3D, 4A, 4B, 4C, 4D:
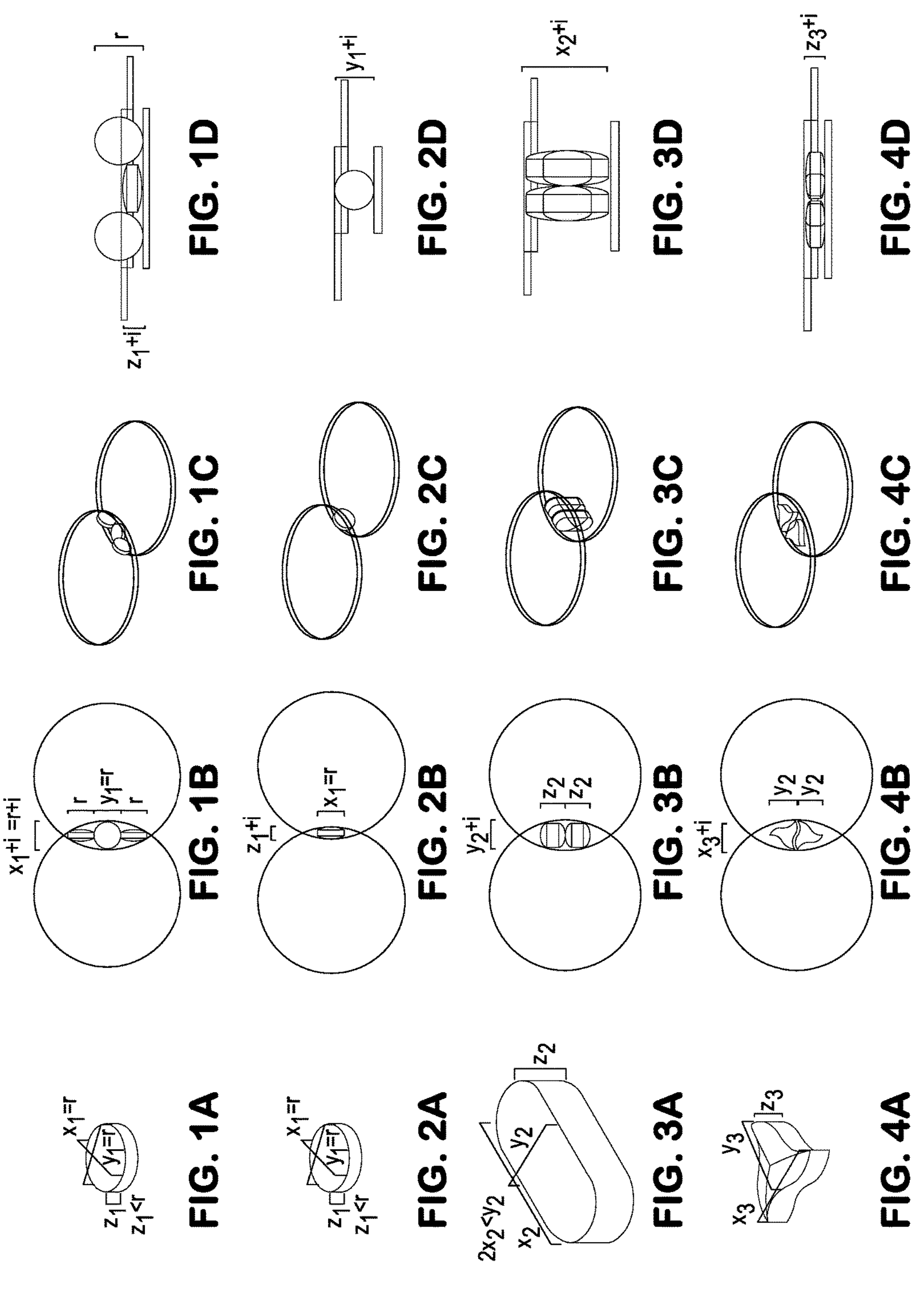
FIGS. 1A to 1D are diagrams of a pill and top, perspective and side views of that pill in an elliptical opening of the type formed by gates of the prior art.
FIGS. 2A to 2D are diagrams of the same pill shown in FIG. 1 but with the pill in a vertical orientation, and top, perspective and side views of that pill in a smaller elliptical opening of the type formed by gates of the prior art.
FIGS. 3A to 3D are diagrams of a second pill and top, perspective and side views of that pill in an elliptical opening of the type formed by gates of the prior art.
FIGS. 4A to 4D are diagrams of a third pill and top, perspective and side views of that pill in an elliptical opening of the type formed by gates of the prior art.
Figures 5A, 5B, 5C, 5D, 6A, 6B, 6C, 6D, 7A, 7B, 7C, 7D, 8A, 8B, 8C, 8D:
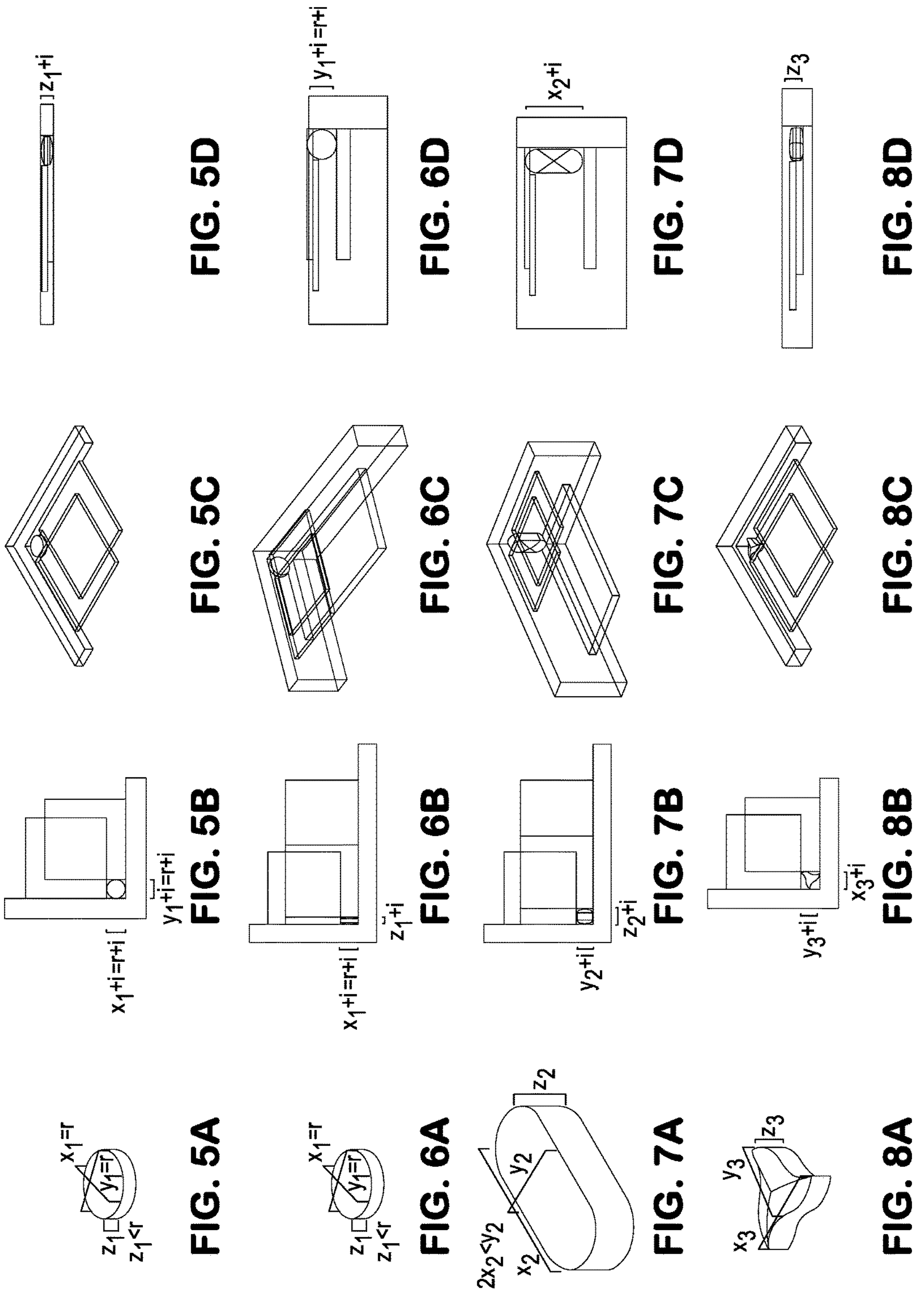
FIGS. 5A to 5D are diagrams of the pill shown in FIG. 1 and in the orientation shown in FIG. 1, and top, perspective and side views of that pill in an opening having linear edges.
FIGS. 6A to 6D are diagrams of the pill shown in FIG. 2 and in the vertical orientation shown in FIG. 2, and top, perspective and side views of that pill in an opening having linear edges.
FIGS. 7A to 7D are diagrams of the pill shown in FIG. 3 and in the orientation shown in FIG. 3, and top, perspective and side views of that pill in an opening having linear edges.
FIGS. 8A to 8D are diagrams of the pill shown in FIG. 4 and in the orientation shown in FIG. 4, and top, perspective and side views of that pill in an opening having linear edges.
Figure 10:
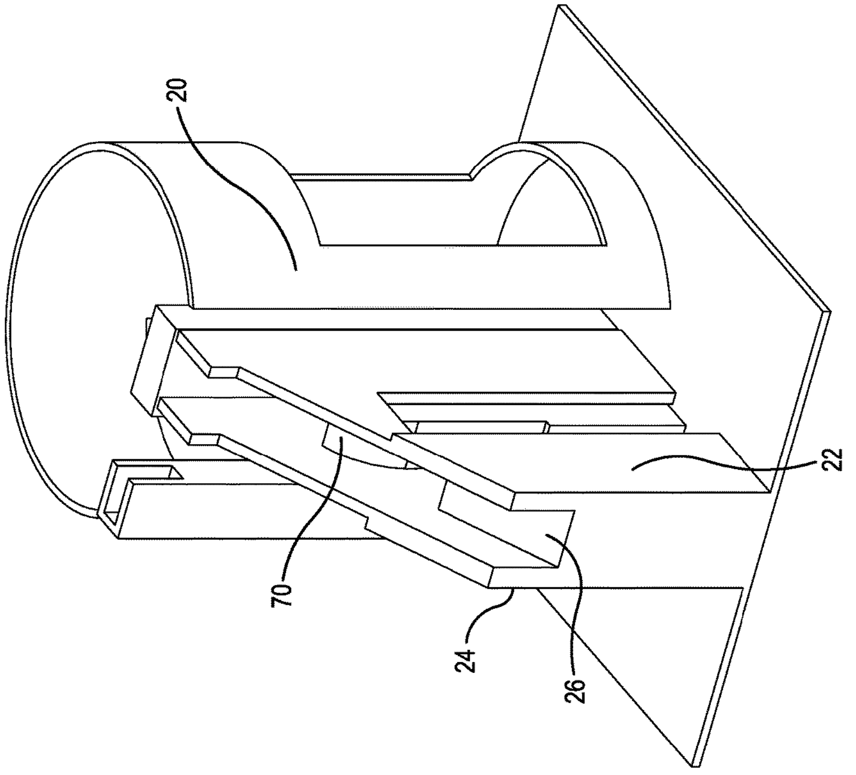
FIG. 10 is a top perspective view of the base of the multi-pill dispenser shown in FIG. 9.
Figure 9:
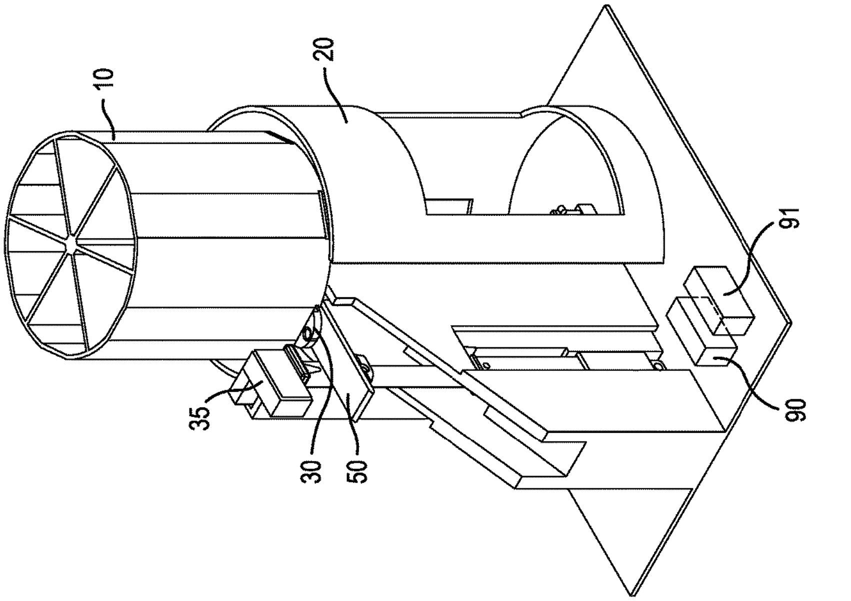
FIG. 9 is a top perspective view of a multi-pill dispenser.
Figure 12:
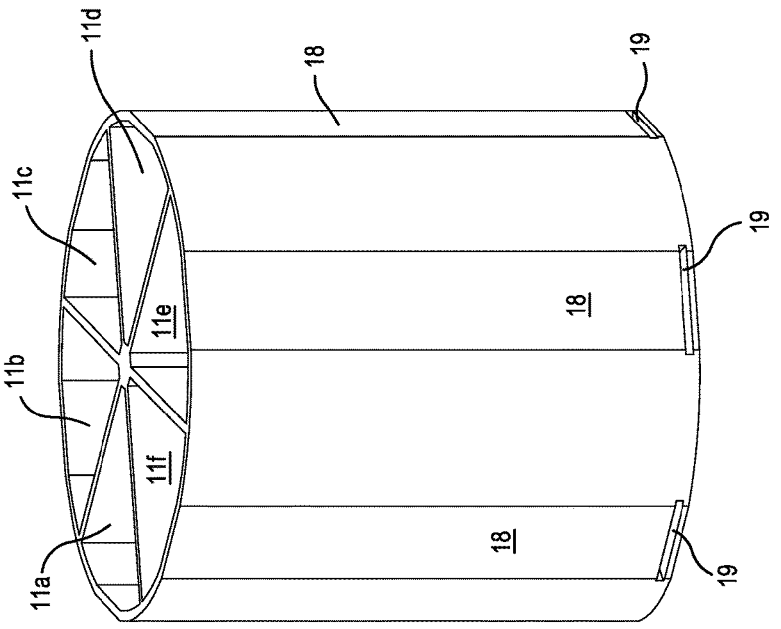
FIG. 12 is a perspective view of the reservoir of the dispenser of FIG. 9.

For purposes of illustration, the disclosed embodiments will be described with reference to pharmaceutical pills, however, it will be appreciated that the disclosed devices and methods can be utilized to dispense other items. For purposes of explanation, it is assumed that the length, width and height dimensions, i.e. dimensions x, y and z for each unit being dispensed are known and fixed. As used herein, the "length" is the longest measurement of the pill taken in the horizontal direction when the pill is at rest on a horizontal surface at its lowest point of potential energy, the "width" is the maximum measurement in a horizontal plane perpendicular to the "length", and the "height" is the maximum measurement in the vertical plane. For reference, the length, width and height will be referred to as dimensions x, y and z (lower case designations). Corresponding gate positions X, Y and Z are equal to dimensions x, y and z, respectively, plus some desired clearance ("i") for each dimension. For example, $X=x+i$ where $i=0.1$ mm. The clearance can be determined by the end user. As used herein, "positions" X, Y and Z refer to a gate which has been opened to provide an opening in the given direction equal to dimension X, Y or Z. For example, a gate opened to position Y has an opening, in the y-direction, equal to $y+i$.

A three gate embodiment comprises a reservoir for holding a plurality of pills and three gates which are movable by computer controlled controllers. According to a first method which can be used when all three dimensions of the pill are known, initially all three dimensions x, y, and z are transmitted, by wire or wirelessly, to a microcontroller. The microcontroller then signals the first gate to move horizontally to position X. Once position X is reached, the microcontroller signals the second gate to move horizontally (in a direction substantially perpendicular to the movement of the first gate) to position Y. Once position Y is reached, the microcontroller signals the third gate to move vertically to position Z. As the third gate is moving to position Z, the pill will descend through and below the first and second gates. In one embodiment, the gates are enclosed by a wall that prevents the pills from falling off any of the gates. Once position Z is reached, the pill will be below the first and second gates and at least one of the first and/or second gates will be signaled to close, in order to prevent more units (pills) from being dispensed. As used herein, the term "closed" includes, but is not limited to, a position in which a gate's position is less than the previously transmitted X, Y, or Z, value. As used herein, the term "fully closed" includes, but is not limited to, a position in which a gate's position does not create an opening for dispensing and all gates are stacked on top of each other.

After the first and/or second gates are entirely closed or at least closed to a point where the openings are smaller than x and y, the third gate is moved further down. As the third gate moves down, the pill is moved off of the third gate in order to be dispensed to the user's desired location. In one embodiment, the pill is moved off the third gate with the assistance of gravity. In this embodiment, the third gate is hinged on one side. As the third gate moves below a predetermined point, a preset ridge forces the third gate to incline towards the desired destination of the pill. In this example, the third gate can be tilted, for example to a 45° angle, causing the pill to fall or slide to the desired destination. Once the pill is at the desired destination, the second gate, if not closed already, is signaled to close. The third gate may be signaled to remain in its position, close, or fully close. The post-dispensing position of the third gate is determined by the end user. In one embodiment, the post-dispensing position of the third gate may be optimized to an intermediate z position to reduce the time between or during dispenses. In another embodiment, the post-dispensing position of the third gate may be fully closed.

All aspects of the preferred device are controlled by a microcontroller 90 which is in electrical communication with an input device 91, such as a desktop computer. The opening of the respective gates to positions X, Y, and Z is achieved with microcontroller 90 programmed to allot a certain amount of time while the gate actuators operate at a constant power per unit of distance traveled In another embodiment, the mechanical devices may move at a constant speed and will stop when sensors provide feedback to the microcontroller to detect that positions X, Y, and Z are achieved.

The determination of which positions (X, Y, and Z) go with each motion device can be set to accommodate limitations of the motion devices installed. For example, in the three gate embodiment, if it is desired to dispense a box having x, y and z dimensions of 3 cm×2 cm×1 cm, respectively, and the first and second gates can only open to a maximum of 3 cm. while the third gate can open to a maximum of 4 cm, the first gate will get position Z. The second gate will get position Y. The third gate will get position X.

According to a second method, if only two of three dimensions of the items to be dispensed are known, the two known dimensions (positions X and Y, X and Z, or Y and Z) are transmitted, by wire or wirelessly, to the microcontroller. The microcontroller then signals the first gate to open to the first known position. Once the first known position is reached, the microcontroller signals the second gate to open to the second known position. Once the second known position is reached, the microcontroller signals the third gate to move in small increments, e.g. 1 mm increments, until one unit of the material is detected by a photoresistor.

This detection stops all gates from moving. At this point, the first and/or second gates are closed, in order to prevent more pills from being dispensed. Once the first and/or second gates are closed, the third gate moves further down. As the third gate moves down, one side of the gate is inclined to tilt towards the desired destination of the material(s). For example, the third gate can be tilted to a 45° angle, causing the pill to fall or slide to the desired destination. Once the pill is at the desired destination, the third gate, and the second gate, if not done already, will close. In a preferred embodiment, a sensor is placed to detect the passage of a unit down the chute. A corresponding signal is sent to the microcontroller. An alarm signal can be generated if the sensor detects multiple units passing down the chute during a single dispensing sequence.

According to a third method, if only one of the three dimensions of the desired items to be dispensed is known, the one know dimension (positions X, Y or Z) is transmitted, by wire or wirelessly, to a microcontroller. The microcontroller then signals one gate, preferably the z or third gate, to the corresponding position. Once the known position is reached, the microcontroller signals the other two gates to move in small increments (ex. 1 mm increments) until a detector detects that the pill has cleared the x and y gates and is resting on the z gate. This detection stops the gates from moving. Alternatively, the two gates corresponding to the unknown dimensions can be moved in small increments but at different rates which correspond to a known shape of the unit being dispensed. Once position Z, the third gate's position after photoresistor-detection is reached, the first and/or second gates are closed, in order to prevent more materials from being dispensed. Once the first and/or second gates are closed, the third gate moves down. As the third gate moves down, one side of the gate is inclined to tilt towards the desired destination of the material(s). Once the third gate tilts to a 45° angle, for example, the unit will fall or slide to the desired destination. Once the unit is at the desired destination, the third gate, and the second gate, if not done already, will close.

FIGS. 9-20 illustrate a multi-pill, three gate dispenser which can be used for any of the three above-described methods. The dispenser illustrated in FIGS. 9-20 is referred to as "multi-pill" dispenser since it is capable of dispensing pills of different sizes and/or shapes from separate compartments. The dispenser in FIGS. 9-20 comprises a material reservoir 10, a base 20, a first gate 30, second gate 40, third gate 50, and microcontroller 90 which is connectable to an input device 91 such as a computer. Reservoir 10 of this illustrated embodiment comprises six separate compartments 11*a*-11*f*, each of which comprise a bottom 12 having a reservoir opening 15 and an outer sidewall 18 having a guide slot 19 for movably receiving and supporting the first gate 30. The interior surface of bottom 12 is inclined toward the reservoir opening 15. Other embodiments can comprise more or fewer separate compartments. The separate compartments are intended for pills of different sizes and/or different shapes.

Each of the gates has a linear, i.e. non-curved, edge. X-gate 30 has a linear edge 33, Y-gate 40 has a linear edge 43, and Z-gate 50 has a flat landing area 53 which acts as a linear edge when defining the depth of a dispense opening and thereby limits the extent to which a pill or other item being dispensed can descend.

Figure 11:
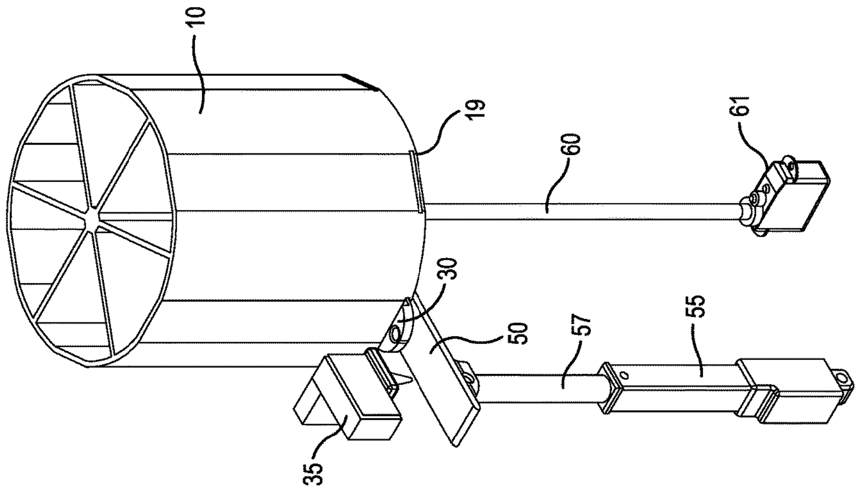
FIG. 11 is a perspective view of the reservoir and vertical gate assembly of the dispenser of FIG. 9.
Figure 14:
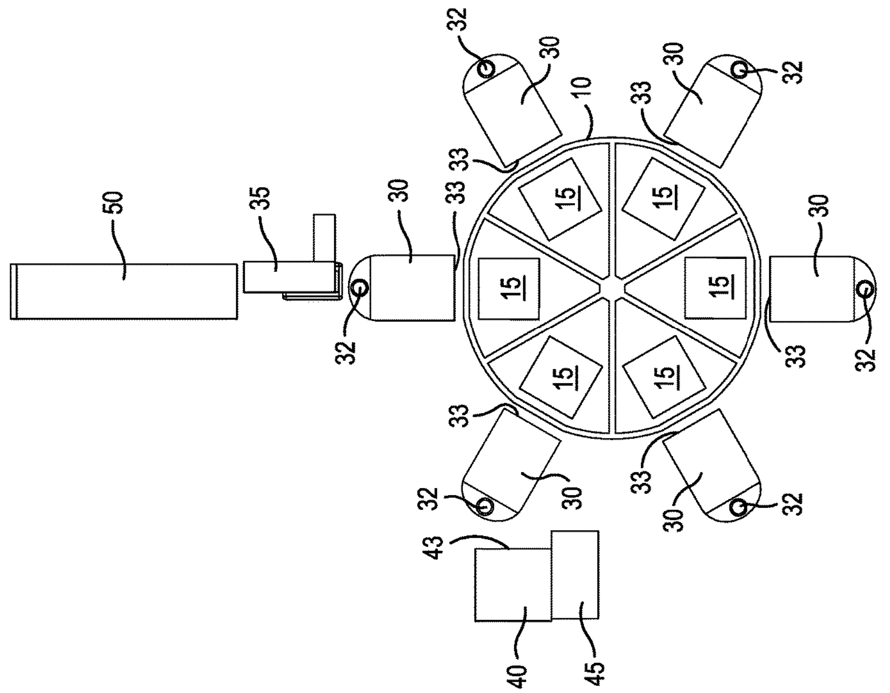
FIG. 14 is a partial exploded, top view of the dispenser of FIG. 9.
Figure 13:
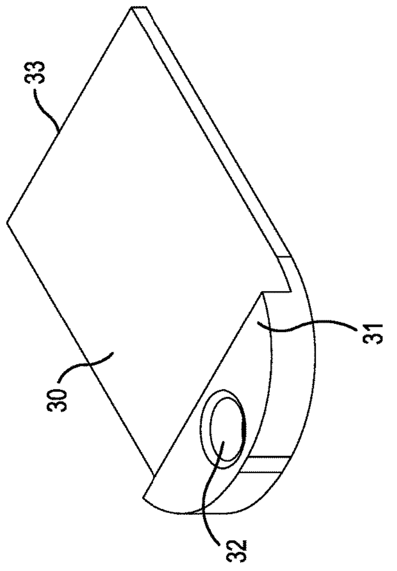
FIG. 13 is a top perspective view of the first gate of the dispenser of FIG. 9.

According to this first illustrated embodiment, there are six first gates 30, one first gate corresponding to each compartment 11 which rotates with the reservoir 10 and stays under the respective compartment 11. The first gates 30 are normally completely closed to prevent pills from falling out the reservoir openings 15 at undesired times. As shown in FIG. 11, the entire reservoir 10 is rotatably mounted on shaft 60 which is driven by a motor 61 located within base 20. Rotation of reservoir 10 is controlled by controller 90 which, as noted above, is linked to one or more suitable input devices.

Reservoir 10 is selectively and automatically rotatable to align the desired compartment 11, and consequently the desired pills, with the dispensing station. Each of the gates at the dispensing station in this illustrated embodiment is linked to a dedicated gate actuator. First gate 30 is linked to a first gate actuator 35 for selectively moving first gate 30 in the x-direction, which in this embodiment is radially, relative to reservoir 10. First gate 30 comprises an outer flange 31 comprising a recess 32 which is engaged by actuator pin 37 on first gate actuator 35. Second gate 40 is connected to a second gate actuator 45 for moving second gate 40 in the y-direction which is perpendicular to the x-direction. Third gate 50 is connected to third gate actuator 55 which comprises an actuator arm 57 for moving the third gate 50 in the z-direction. In this illustrated embodiment, the second gate and the third gate are movably positioned below the first gate. The gates in a pill dispenser are preferably fairly thin, e.g. about 1-3 mm, preferably about 2 mm in thickness. The microcontroller 90 is in communication with all three of the gate actuators and controls the timing and movement of the gate actuators. These connections are not shown.

Figure 16:
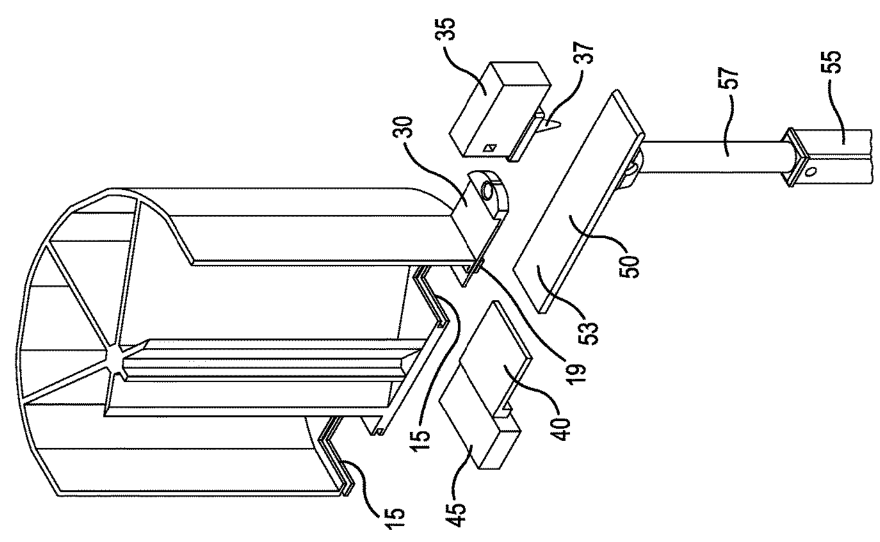
FIG. 16 is a partial exploded, bottom perspective view of the dispenser of FIG. 9 with sections of the reservoir removed.
Figure 15:
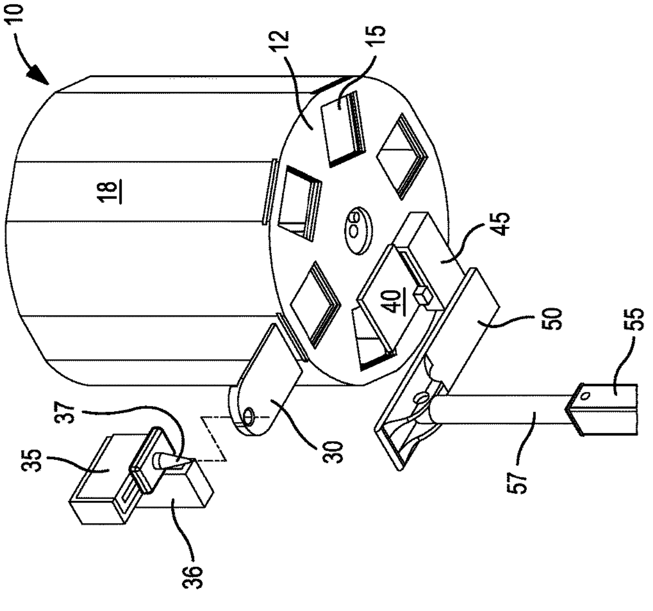
FIG. 15 is a partial exploded, bottom perspective view of the dispenser of FIG. 9.
Figure 18:
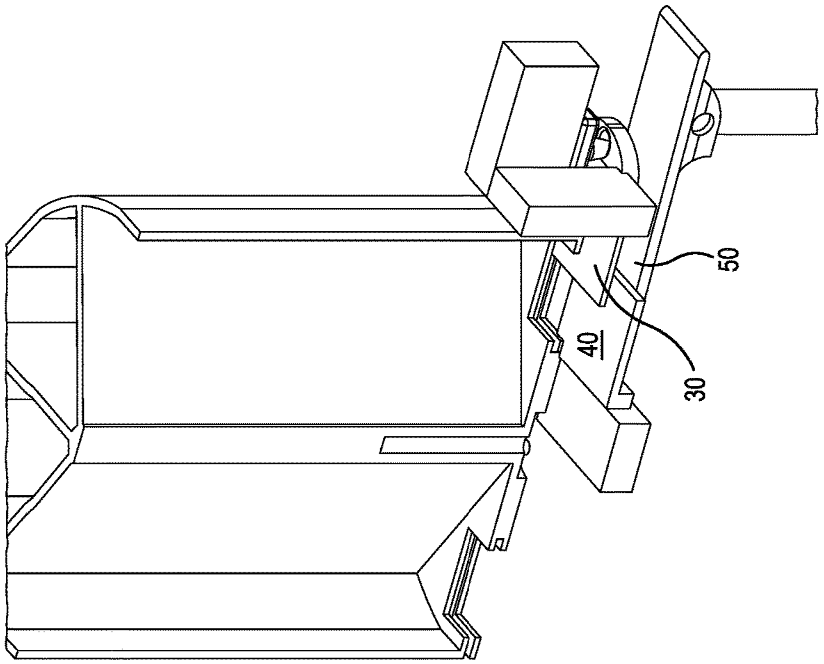
FIG. 18 is a top perspective view of the reservoir and gates of the dispenser of FIG. 9 with sections removed.
Figure 17:
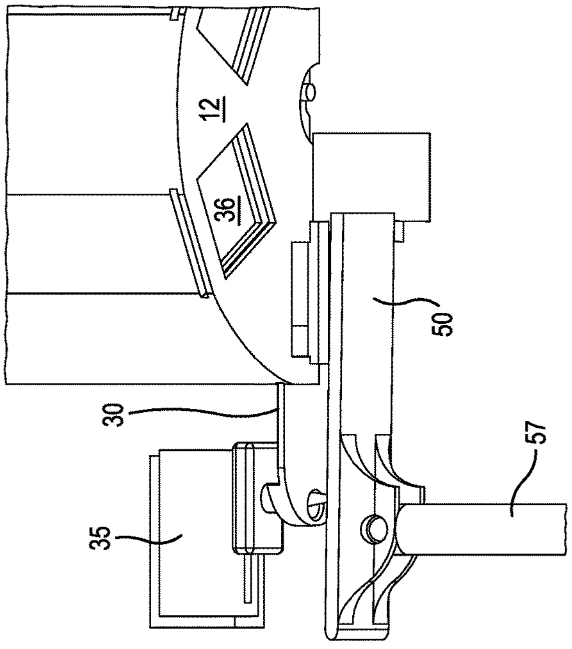
FIG. 17 is a bottom perspective views of the dispenser of FIG. 9 with sections removed.

This first illustrated embodiment has a single dispensing station which comprises the first gate actuator 35, the second gate 40, the second gate actuator 45, the third gate 50 and the third gate actuator 55. Since there is only one first gate actuator 35 but six first gates 30, the linkage between first gate actuator 35 and each first gate 30 is selectively disengagable. First gate actuator 35 is selectively movable (in this embodiment, raised) to disengage actuator pin 37 from the recess 32 of the first gate at the dispensing station before the reservoir is rotated. When a compartment is positioned at the dispensing station, the first gate actuator 35 is lowered so that actuator pin 37 is lowered through recess 32 in order to link the first gate actuator 35 to the first gate 30 which is now positioned at the dispensing station. FIG. 17 shows actuator pin 37 engaged with recess 32 in first gate 30. FIG. 16 is an exploded view of the three gates and gate actuators with arrows indicating their respective directions of movement. FIG. 18 shows a dispensing opening formed by the linear edges of X-gate 30 and Y-gate 40

One or more sensors are employed to detect a potential jam in the dispensing operation. One way a jam can be detected is a photodetector aligned with the third gate can binarily detect the presence or absence of a pill after positions X, Y, and Z are achieved by the gates. If an absence is detected, the microcontroller or connected computer will initiate a jam clearing program.

Alternatively, a jam can be detected by a sensor aligned with one of the gates. In one embodiment, a linear potentiometer is aligned with each gate. If a potentiometer detects that a gate cannot close during the dispensing program, the microcontroller or computer will initiate a jam clearing program. The jam clearing program, the microcontroller will signal the gates to fully close in reverse order. The gates will fully close, sequentially, not simultaneously, in the sequence of Z, Y, X. In one embodiment, the X and Y gates have beveled edges. The beveled edges push the pills upwardly during the jam clearing program.

Figure 21:
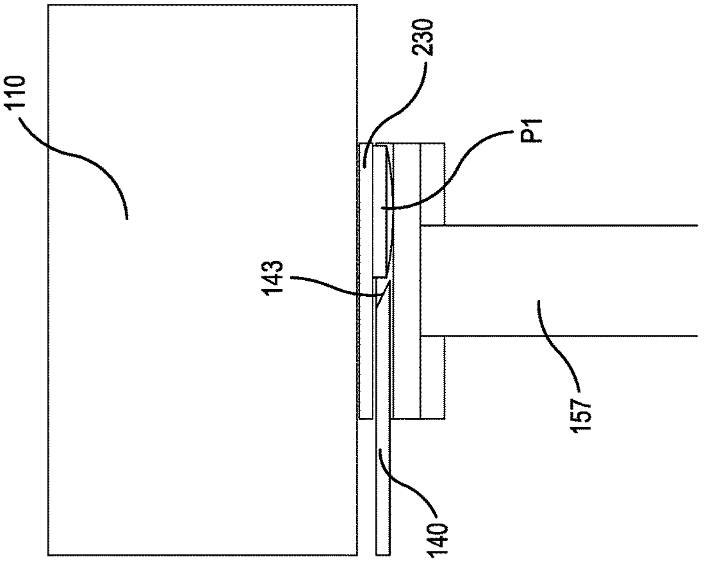
FIG. 21 is a partial, view of the three gates of an alternative embodiment showing the beveled edge of the Y-gate.
Figure 22:
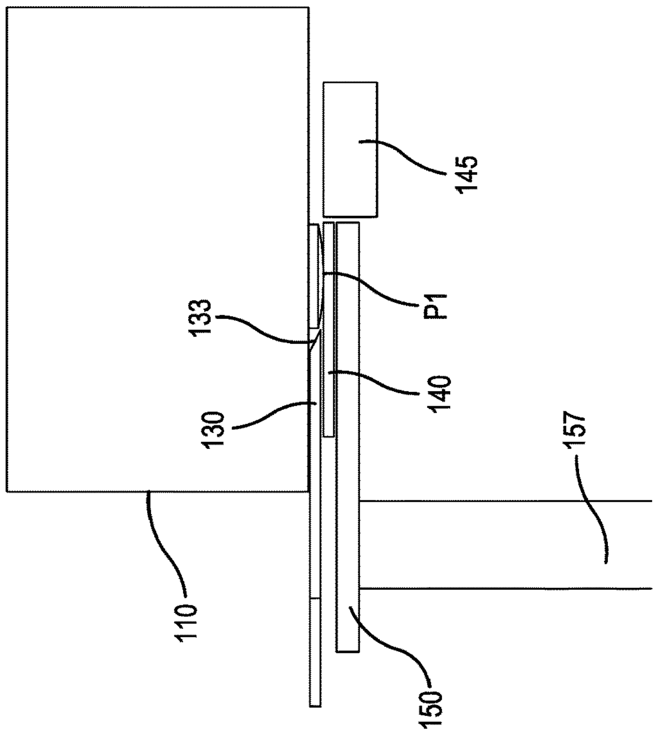
FIG. 22 is a partial, view of the three gates of the embodiment shown in FIG. 21 taken from a perspective 90° offset from the perspective of FIG. 21 showing the beveled edge of the X-gate.

FIGS. 21 and 22 illustrate two gates of an alternative embodiment which have beveled dispensing edges. FIG. 21 shows a pill P resting on Z-gate 50. The jam clearing program will first close Y-gate 140. The beveled edge 143 on Y-gate 140 will raise the pill P up to the position shown in FIG. 22 where the pill rests on Y-gate 140. Next, the X-gate 130 will then be closed. Beveled edge 133 on X-gate 30 will return the pill P to the reservoir. After the jam clearing program is complete, the microcontroller preferably signals an agitation component, as discussed further, to agitate the reservoir to realign the units in the reservoir. The gates will then be signaled to reinitiate the programmed dispense sequence. Alternatively, the microcontroller will report the first jam to the end user, or a user-determined number of jams, by signaling an alert on a connected audio or visual component, such as a speaker or computer screen.

Figure 19:
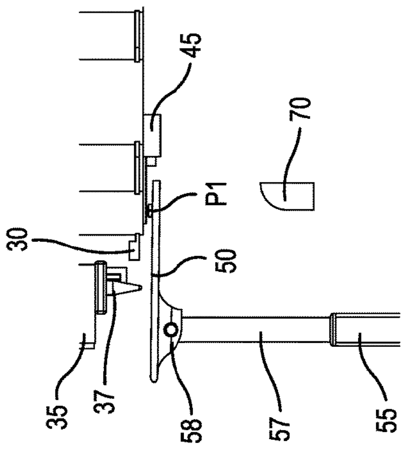
FIGS. 19 and 20 are partial side views of the dispenser of FIG. 9 with sections removed showing the Z-gate in raised and lowered positions, respectively.
Figure 20:
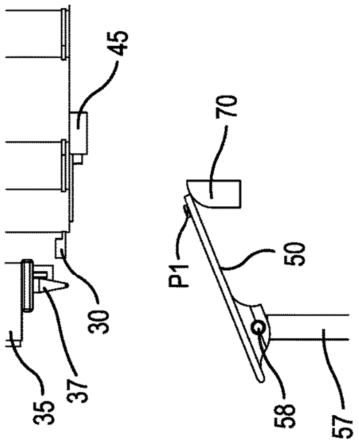
Figure 23:
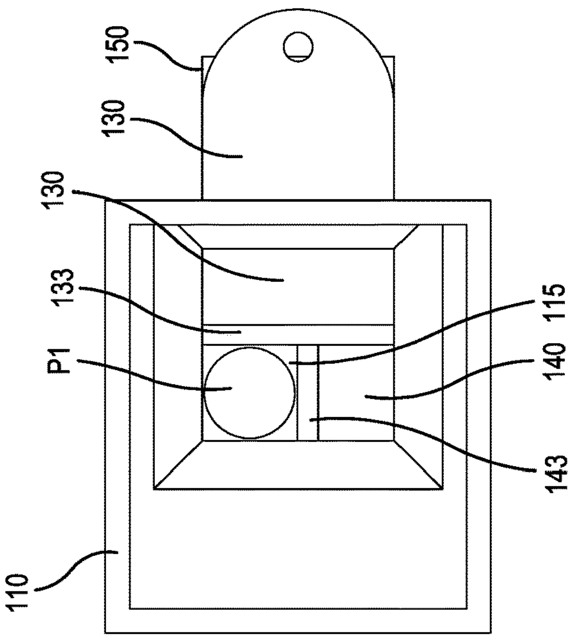
FIG. 23 is a top view of the gates and reservoir of FIG. 21 showing the beveled edges of the X-gate and Y-gate.

Base 20 of the first illustrated embodiment comprises a chute defined by the inner sides of right sidewall 22, left sidewall 24 and inclined ramp 26. With reference to FIGS. 19 and 20, in this embodiment the Z-gate 50 is hingedly connected to actuator arm 57, which raises and lower Z-gate 50. This hinge connection is restrictive in that it will only allow rotation motion within a range of angles. The Z gate in a neutral position has an angle of 0° with the horizontal. The Z-gate will be caused to rotate in a direction to align with ramp 26, i.e. such that the end of the gate closest to the reservoir will be higher than the end of the gate that is closer to actuator arm 57. As the Z gate is being lowered, a fixed platform 70 underneath the Z-gate and the hinge connection causes the Z-gate to tilt as the Z-gate is lowered past the top of the fixed platform 70. This slope will cause the unit being dispensed to move down the inclined ramp 26 toward an opening that will eventually lead to the user being able to collect or retrieve said dispensed unit.

Repetition of the dispensing process can be controlled to dispense one or more of each unit in each of the compartments 11 in dispenser 10. All of the embodiments can be applied to multi-pill situations. In many situations, the reservoirs are homogenous in their contents. For example, a single reservoir contains identical pills. In this example, the mechanism can dispense n number of pills as long as one of nX, nY, and nZ is less than the physical movement limitations of the gates.

Figure 24:
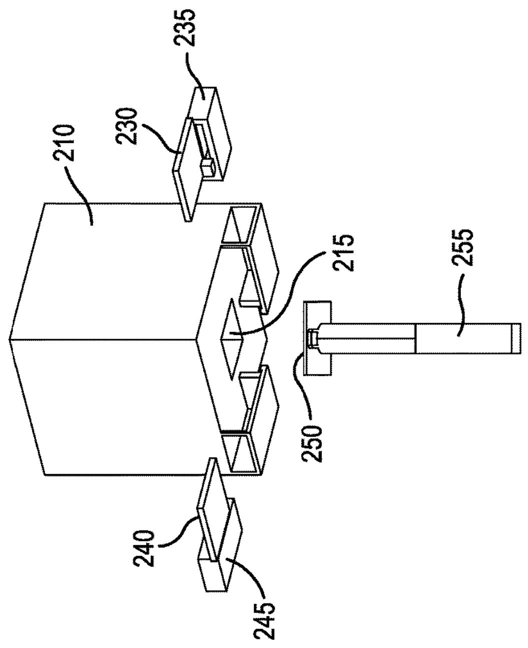
FIG. 24 is an exploded bottom, perspective view of the reservoir and three gates of a single pill dispenser.
Figure 25:
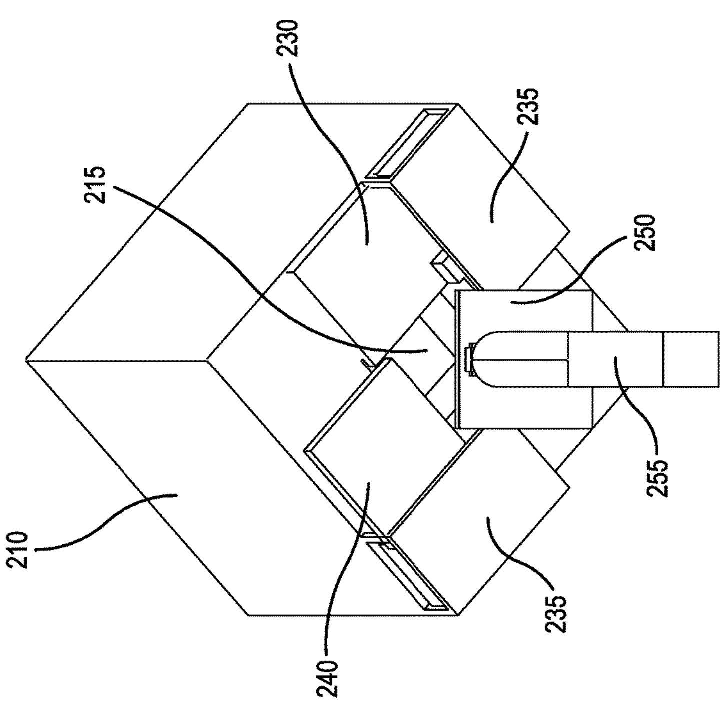
FIG. 25 is a bottom perspective view of the single pill dispenser of FIG. 24.

A second, single pill/unit embodiment is partially illustrated in FIGS. 24 and 25 which are exploded and assembled bottom perspective views, respectively. This embodiment comprises a single compartment reservoir 210 having a bottom opening 215. The gates operate in the same manner as described above with reference to the embodiment shown in FIGS. 9-20. A first gate 230 is linked to a first gate actuator 235, a second gate 240 is linked to a second gate actuator 245 and a third gate 250 is linked to a third gate actuator 255.

Figure 26A:
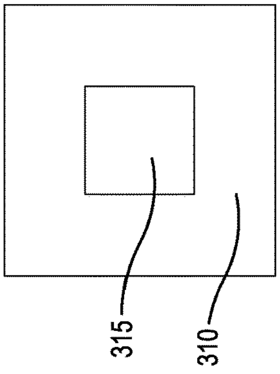
FIG. 26A is a diagrammatic bottom view of an embodiment without the first gate and second gate.
Figure 26B:
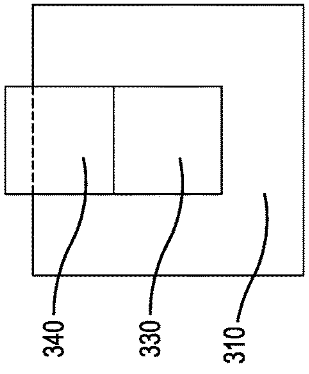
FIGS. 26B-26D are diagrammatic bottom views of an embodiment comprising a first gate and a second gate in the same plane.
Figure 26C:
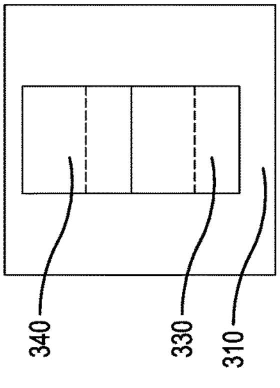
Figure 26D:
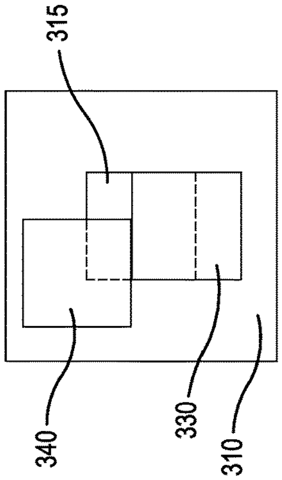
Figure 27:
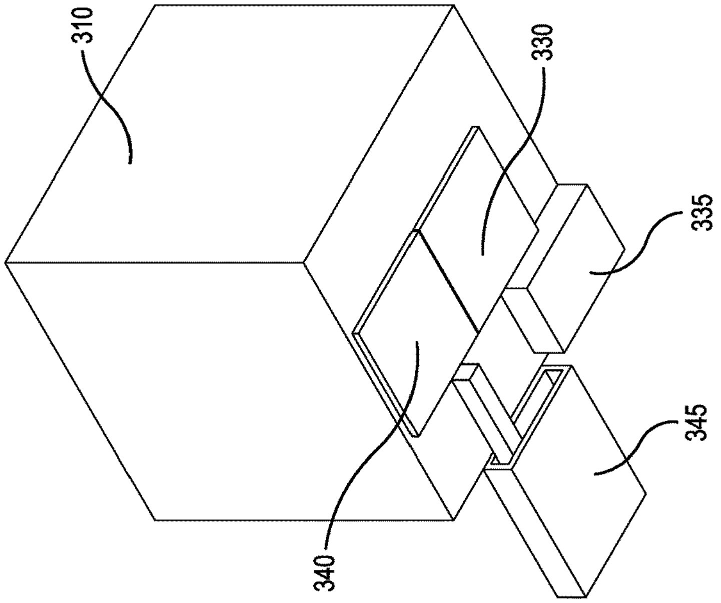
FIGS. 27 and 28 are bottom, perspective views of an embodiment comprising a first gate and a second gate in the same plane with the opening obstructed and open, respectively.

FIGS. 26A-26D, 27 and 28 illustrate a third, three-gate embodiment where the first gate and the second gate are in the same plane, preferably a substantially horizontal plane. The third gate is not shown. FIG. 26 A is a diagrammatic bottom view showing compartment reservoir 310 and reservoir opening 315 without the first and second gate. FIGS. 26B-26D are diagrammatic bottom views of first gate 330 and second gate 340 in three different positions relative to a reservoir opening 315 shown in phantom. According to this embodiment, second gate 340 is linked to first gate 330 so that when the first gate 330 moves in the x-direction, second gate 340 moves the same distance in the x-direction. Second gate 340 also has the ability to move independently of the first gate in the y-direction.

In FIG. 26B, opening 315 is entirely obstructed by first gate 330. In FIG. 26C, opening 315 is shown in phantom and first gate 330 has moved a distance X to the left relative to opening 315 and second gate 340 has accompanied first gate 330 during this leftward movement. At this point, opening 315 is still entirely obstructed, but the linear border between first gate 330 and second 340 is now aligned under opening 315. In FIG. 26D, second gate 340 has moved (downwardly on the page) a distance Y thereby leaving an unobstructed section below opening 315 with dimensions X by Y. This embodiment is useful for small items to be dispensed where the thickness of two gates may adversely influence the desired alignment of the item as it passes through the opening past the first gate and the second gate.

Figure 29:
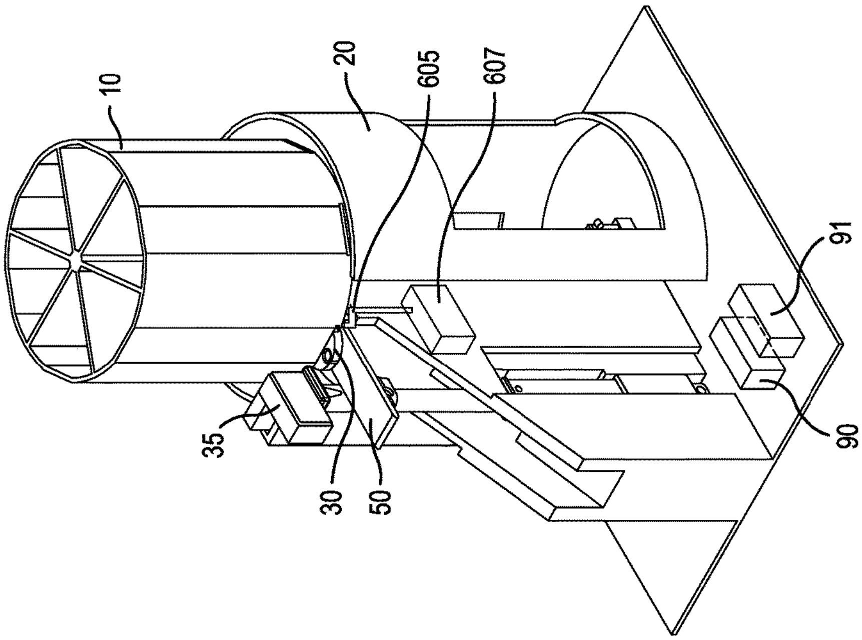
FIG. 29 is a top perspective view of a multi-pill dispenser with vacuum components.
Figure 28:
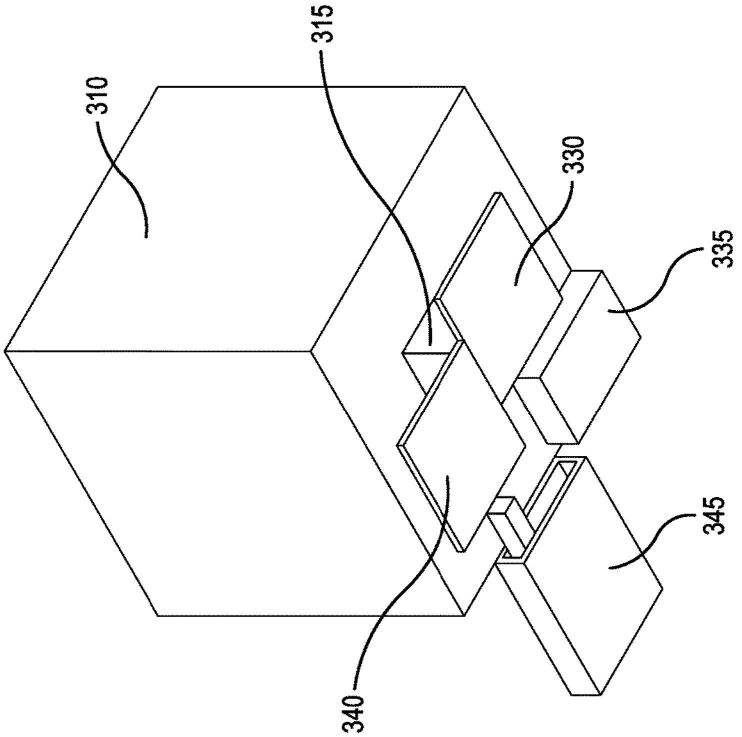

In another embodiment, dispensing can be supplemented with one or more vacuum devices. In FIG. 29, a vacuum is created by a vacuum pump 607 and is controllable by a microcontroller. The vacuum can be directed toward the z gate with vacuum tip 605. Alternatively, the area under the gates can be sealed and a vacuum applied with vacuum pump 607 to generate a vacuum without the vacuum tip 605, so that the vacuum applies a downwardly directed force below the dispensing opening. The vacuum will increase the downward force on the unit to be dispensed, which will assist the unit in falling into the space created by all three gates. The vacuum pump will be turned off by the microcontroller after a photoresistor has detected a unit has fallen onto the z gate.

The following is additional information relative to some of the components described above.

Reservoir

The reservoir is shaped and sized to meet the needs of the dispensing. For example, the reservoir may be shaped as a rectangular prism, cylinder, cone, conical frustum, or trapezoidal prism. The bottom surface(s) of each component are preferably inclined toward the dispensing opening. Additionally, the reservoir does need to be fixed in position above the dispensing mechanics. The reservoir can move relative to the dispenser and be removable or movable from the other dispensing mechanics. Multiple reservoirs can be arranged so that either the reservoirs will move to a dispensing station, i.e. the dispensing mechanics or the dispensing mechanics will move to the reservoirs. The "dispensing mechanics" refers to the gates and gate motion devices.

Gates

The gates are shaped and sized to meet the needs of the dispensing. For example, the gates may be shaped as rectangular prisms, cylinders, conical, trapezoidal prisms, conical frustums, triangular prisms, or pyramids. Alternatively, the gates may be any shape with a beveled edge to assist the aforementioned jamming program. In one embodiment, the gates are rectangular prisms and the top edges, not adjacent to the motion control device, are have sickled, beveled edges to act like a shovel during a jam.

Motion Devices

For the Z-Direction Gate and the Two-Gate XY Method:

The gates may be connected to or integral with the gate actuators which serve as gate motion devices. These motion devices are meant to linearly move the gates. The linear motion devices may be any suitable devices, including one or more of the following: electromechanical linear servos or actuators, electromagnetic linear servos or actuators, solenoids, pneumatic actuators (air or non-air, pneumatic fluid), linear smart-memory alloy component, circular-motion motors or servos attached to linear motion adapters, reciprocating motion components, linear gear racks, chains, belts, threaded rods, or drive-shafts.

Agitating Devices

For certain dispensing needs, it may be desirable to agitate the reservoir and its contents to ensure that the material(s) falls into the dispensing opening. This may be achieved with a vibration motor, piezoelectric component, or shaker motor connected to the reservoir. Alternatively, a sweeping arm may be placed inside the reservoir or proximate to gates to agitate the materials. Agitation can be employed during any stage of the dispensing sequence or the jamming program.

Sensors

Preferably, at least one sensor is placed on or near one or more of the gates to ensure that the desired material(s) has been dispensed. This may be achieved with, for example, a photoresistor, optical sensor, infrared sensor, ultrasonic sensor, pressure sensor, force sensor, or mass sensor. One sensor detects when a unit of material is on the Z-gate and has cleared the X and Y gates, while another detects when it has been dispensed from, e.g. fallen off, the Z-gate. Another sensor may be located proximate to the chute of the mechanism to detect if and how many units have dispensed. Also, a sensor or sensors may be placed on or near each of the gates to ensure that the gates have moved to the desired position(s). This may be achieved with, for example, a potentiometer, photoresistor, infrared sensor, light sensor, ultrasonic sensor, pressure sensor, force sensor, or mass sensor. Sensors may send signals, by wire or wirelessly, to a microcontroller or computer for processing.

Microcontroller and Input Device

The microcontroller preferably receives commands or programs by wire or wirelessly. The programs can be used by the microcontroller, for example, to interact with motion devices, sensors, and alarms. It receives these commands or programs from an input device, such as a computer, server, remote control, mobile phone, or tablet. If connected wirelessly, the microcontroller may require a wire-attached wireless module. Wireless communication methods may include Bluetooth, WiFi, WiFi Direct, radio transmission, and/or Near Field Communication (NFC).

The invention claimed is:

1. A device for dispensing a unit of material from a plurality of units comprising:

a reservoir comprising an opening and at least one sidewall for storing a plurality of units;

a first gate comprising a first linear opening edge, said first gate movable in an x-direction;

a second gate comprising a second linear opening edge, said second gate movable in a y-direction;

a third gate comprising a third linear dispensing surface, said third gate movable in a z-direction, wherein said x-direction, y-direction and z-direction are substantially perpendicular to each other;

at least one motion device for moving said first gate in said x-direction, said second gate in said y-direction and said third gate in said z-direction; and a controller for controlling said at least one motion device.

2. A device according to claim 1 wherein said first linear opening edge comprises a beveled surface.

3. A device according to claim 2 wherein said second linear opening edge comprises a beveled surface.

4. A device according to claim 1 wherein said reservoir comprises a plurality of separate compartments.

5. A device according to claim 4 comprising a first gate for each of said separate compartments.

6. A device according to claim 5 comprising a gate actuator which is selectively disengagable with each of said first gates.

7. A device according to claim 4 wherein said reservoir is rotatably mounted on a motor-driven shaft.

8. A device according to claim 7 wherein said motor-driven shaft is operatively linked to said controller.

9. A device according to claim 1 wherein said first gate and said second gate are movable within the same plane.

10. A device according to claim 1 further comprising a vacuum inducing component.

11. A pill dispenser for dispensing pills comprising:

a reservoir comprising an opening and at least one side-wall for storing a plurality of pills;

a first gate comprising a first linear opening edge, said first gate movable in a horizontal x-direction;

a second gate comprising a second linear opening edge, said second gate movable in a horizontal y-direction;

a third gate comprising a dispensing surface movable in a z-direction, wherein said x-direction, y-direction and z-direction are substantially perpendicular to each other;

at least one motion device for moving said first gate in said x-direction, said second gate in said y-direction and said third gate in said z-direction; and a controller for controlling said at least one motion device.

12. A pill dispenser according to claim 11 wherein said first gate and said second gate are movable within the same plane.

13. A pill dispenser according to claim 11 wherein said reservoir comprises a plurality of compartments for pills.

14. A pill dispenser according to claim 13 comprising a plurality of first gates wherein a first gate is associated with each of said compartments.

15. A pill dispenser according to claim 11 wherein the controller is adapted to manipulate at least one gate.

16. A pill dispenser according to claim 11 wherein at least two of said gates move to create a rectangular prism-shaped dispensing opening.

17. A pill dispenser according to claim 11 further comprising a detector which senses whether a pill has entered the dispensing opening.

18. A pill dispenser according to claim 11 further comprising a vibration inducing component.

19. A pill dispenser according to claim 11 wherein said controller is operatively linked to movement devices that move said gates in linear directions.

* * * * *